US012594868B2

(12) United States Patent
Larsson et al.

(10) Patent No.: US 12,594,868 B2
(45) Date of Patent: Apr. 7, 2026

(54) BUNK FOR A VEHICLE CAB

(71) Applicant: Volvo Truck Corporation, Gothenburg (SE)

(72) Inventors: Linus Larsson, Gothenburg (SE); Zoran Vasiloski, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 120 days.

(21) Appl. No.: 18/534,601

(22) Filed: Dec. 9, 2023

(65) Prior Publication Data

US 2024/0227649 A1 Jul. 11, 2024

(30) Foreign Application Priority Data

Jan. 6, 2023 (EP) ..................................... 23150598

(51) Int. Cl.
*B60N 3/00* (2006.01)

(52) U.S. Cl.
CPC .................................... *B60N 3/008* (2013.01)

(58) Field of Classification Search
CPC .......... B60N 3/008; B60N 3/001; B60N 2/34; A47C 17/80; A47C 19/005; A47C 19/20; A47C 17/76; A47C 17/645
See application file for complete search history.

(56) References Cited

U.S. PATENT DOCUMENTS 1,125,005 A * 1/1915 clark .................... B60N 2/2854
5/104
1,258,694 A * 3/1918 miller ...................... A61G 3/00
296/19
1,284,651 A * 11/1918 gordanier ............... A47C 17/80
5/118
1,377,852 A * 5/1921 patterson ............... B60N 3/008
5/119
1,403,425 A * 1/1922 Line ........................ A47C 17/80
5/118
1,428,642 A * 9/1922 Lambie .................. A47C 17/62
5/503.1

(Continued)

FOREIGN PATENT DOCUMENTS

EP 0168708 A1 * 1/1986 ........... B60N 2/4214
EP 1516780 A2 3/2005

(Continued)

OTHER PUBLICATIONS

European Search Report and Written Opinion for European Patent Application No. 23150598.3, completed Jun. 16, 2023, 10 pages.

*Primary Examiner* — David E Sosnowski
(74) *Attorney, Agent, or Firm* — Withrow & Terranova, PLLC

(57) ABSTRACT

The bunk comprises a frame attached to the cab, having a front beam, a rear beam, and side beams, each side beam comprising a front segment and a rear segment; and a supporting structure coupled to the frame and extending over the inner surface of the frame. The bunk can change from a normal state, in which the front and rear beams are spaced apart by a nominal distance Dn, the front and rear segments being in a first relative position, to a collapsed state, in which the front and rear beams are spaced apart by a distance D<Dn, and in which the front and rear segments are in a second relative position.

15 Claims, 9 Drawing Sheets

(56) References Cited

U.S. PATENT DOCUMENTS

| | | | | | |
|---|---|---|---|---|---|
| 1,493,104 | A | * | 5/1924 | Carrigan | A47C 17/80 5/118 |
| 1,545,104 | A | * | 7/1925 | Keith | A47C 17/80 5/118 |
| 1,546,581 | A | * | 7/1925 | Hofford | A47C 17/80 5/119 |
| 1,576,919 | A | * | 3/1926 | Lowery | A47C 17/80 5/119 |
| 2,634,432 | A | * | 4/1953 | Ehrenberg | A47D 9/016 5/314.1 |
| 2,759,199 | A | * | 8/1956 | Wollam | A47C 17/80 5/119 |
| 3,336,060 | A | * | 8/1967 | Bradford | A61G 1/003 5/8 |
| 3,426,367 | A | * | 2/1969 | Bradford | A61G 1/013 5/628 |
| 3,524,673 | A | * | 8/1970 | Beeson | B62D 33/0612 5/118 |
| 3,558,180 | A | * | 1/1971 | algire | B62D 33/0612 D12/96 |
| 3,601,824 | A | * | 8/1971 | Bradford | A61G 1/013 5/628 |
| 3,611,452 | A | * | 10/1971 | turko | A61G 7/005 5/610 |
| 3,738,705 | A | * | 6/1973 | Hill | A47C 20/04 5/112 |
| 3,837,019 | A | * | 9/1974 | Hoff | A47D 9/005 5/413 R |
| 4,044,410 | A | * | 8/1977 | Klingler | B60P 3/38 5/9.1 |
| 4,664,438 | A | * | 5/1987 | Crepaldi | B62D 33/0612 296/187.05 |
| 4,868,939 | A | * | 9/1989 | Tagtow | A47C 17/80 5/118 |
| 4,977,631 | A | * | 12/1990 | Bretz | B62D 33/0612 267/74 |
| 5,384,926 | A | * | 1/1995 | Al-Bargi | A61G 1/013 5/628 |
| 5,638,560 | A | * | 6/1997 | Rigdon | A47C 17/80 5/118 |
| 6,932,408 | B1 | * | 8/2005 | Lyod, Jr. | B60N 2/005 5/118 |
| 8,127,381 | B2 | * | 3/2012 | Westmoreland, II | A61G 1/013 5/176.1 |
| 9,198,520 | B2 | * | 12/2015 | Goldsmith | A47C 19/025 |
| 9,713,388 | B2 | * | 7/2017 | Goldsmith | A47C 20/041 |
| 10,149,548 | B2 | * | 12/2018 | Ray | A47C 17/74 |
| 11,311,110 | B1 | * | 4/2022 | McDade | A47C 19/20 |
| 11,613,198 | B1 | * | 3/2023 | Carlseen | B60P 3/39 296/165 |
| 12,441,415 | B2 | * | 10/2025 | Burrows | B62D 37/02 |
| 2004/0010852 | A1 | * | 1/2004 | Bourgraf, Jr. | A61G 1/013 5/628 |
| 2008/0040853 | A1 | * | 2/2008 | Martin | A47C 17/80 5/118 |
| 2009/0077744 | A1 | * | 3/2009 | Kim | A61G 7/001 5/202 |
| 2009/0077747 | A1 | * | 3/2009 | Kim | A61G 7/16 5/607 |
| 2009/0106896 | A1 | * | 4/2009 | Olah | A47C 17/50 5/118 |
| 2009/0134648 | A1 | * | 5/2009 | Maximilien | B60N 3/008 5/118 |
| 2012/0054959 | A1 | * | 3/2012 | Stimel | B60N 2/34 5/9.1 |
| 2012/0124738 | A1 | * | 5/2012 | Jones | B60P 3/39 5/10.2 |
| 2016/0129827 | A1 | * | 5/2016 | Johnston | A47C 17/80 5/118 |
| 2019/0045937 | A1 | * | 2/2019 | Reynolds | A47C 17/82 |
| 2019/0092247 | A1 | * | 3/2019 | Dabel | B60N 3/083 |
| 2020/0406810 | A1 | * | 12/2020 | Osorio | B60P 3/39 |
| 2021/0146844 | A1 | * | 5/2021 | Smith | A47C 17/80 |
| 2021/0178940 | A1 | * | 6/2021 | Fakhoury | A47C 17/80 |
| 2022/0212593 | A1 | * | 7/2022 | Osorio | B60N 3/008 |
| 2023/0028471 | A1 | * | 1/2023 | Ebenroth | B60P 3/39 |
| 2023/0126769 | A1 | * | 4/2023 | Bonslaver | B60N 2/34 108/44 |
| 2023/0322310 | A1 | * | 10/2023 | Thangamariappan | B60N 2/34 296/190.02 |
| 2023/0397738 | A1 | * | 12/2023 | Torres | A47C 17/13 |
| 2024/0043123 | A1 | * | 2/2024 | Kodati | B64D 11/0644 |
| 2024/0278708 | A1 | * | 8/2024 | Johnson | B60P 3/39 |
| 2024/0383392 | A1 | * | 11/2024 | Barth | A47C 19/20 |
| 2024/0425128 | A1 | * | 12/2024 | Dorszynski | B60R 16/0207 |

FOREIGN PATENT DOCUMENTS

| | | | | | |
|---|---|---|---|---|---|
| JP | | S6215256 U | * | 1/1987 | |
| WO | WO-2006131634 A2 | * | 12/2006 | | B60N 3/008 |
| WO | 20222638 A1 | | 11/2020 | | |
| WO | WO-2020222642 A1 | * | 11/2020 | | B60N 3/008 |

* cited by examiner

Fig. 18
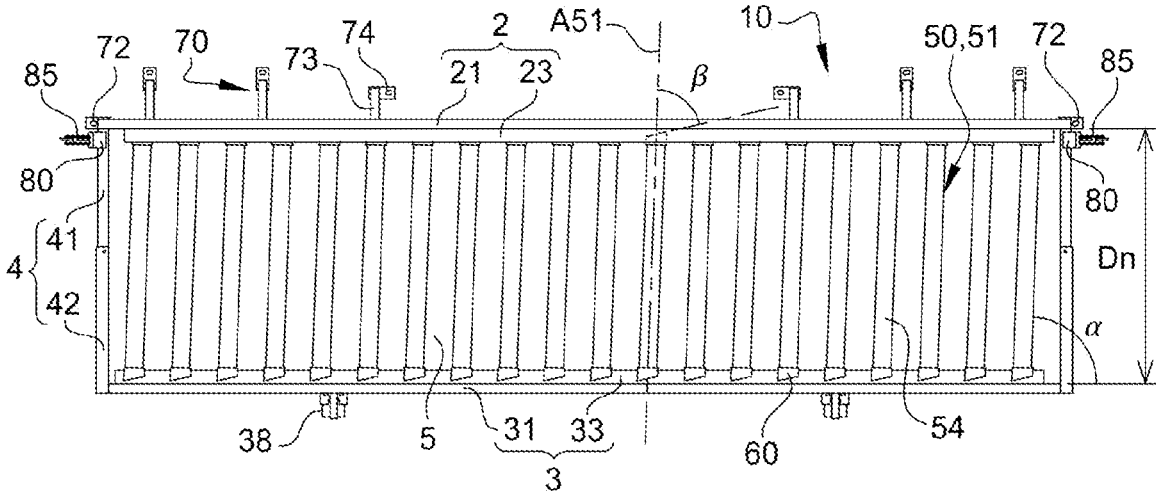
Fig. 19
Fig. 20
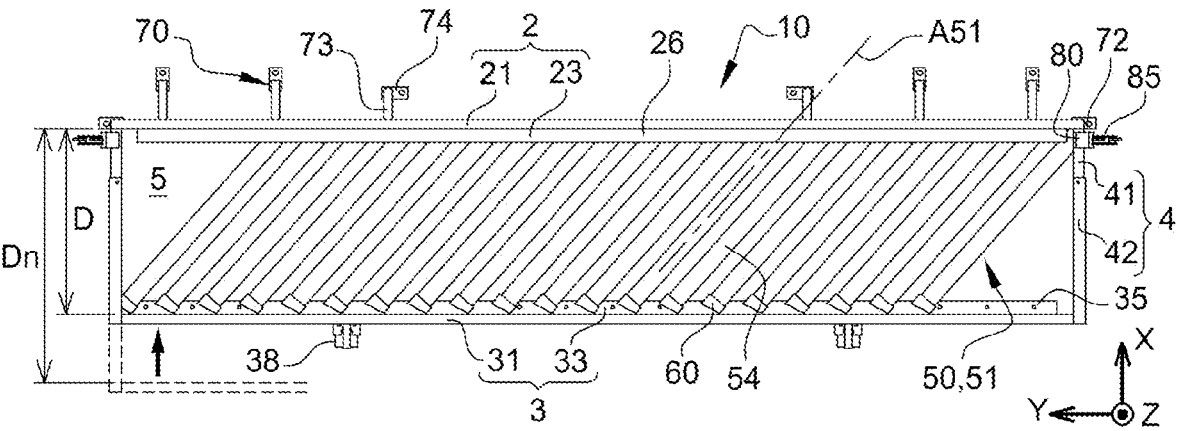

BUNK FOR A VEHICLE CAB

PRIORITY APPLICATIONS

The present application claims priority to European patent application Ser. No. 23/150,598.3, filed on Jan. 6, 2023, and entitled "BUNK FOR A VEHICLE CAB," which is incorporated herein by reference in its entirety.

TECHNICAL FIELD

The disclosure relates to a bunk for a vehicle cab. The disclosure can be applied in heavy-duty vehicles, such as trucks, buses, and construction equipment. Although the disclosure may be described with respect to a particular vehicle, the disclosure is not restricted to any particular vehicle.

BACKGROUND

Industrial vehicles can be used to carry freight between places located far from each other. As a consequence, the driver of such a vehicle can spend several days on the road and may sleep in the vehicle cab. For this reason, cabs are generally equipped with bunks located behind the driver and passenger seats.

In case of a vehicular collision, the cab can be deformed and the bunk can be pushed forward with a risk of hitting and injuring the cab occupant(s).

SUMMARY

According to a first aspect, the disclosure concerns a bunk for a cab of a vehicle, comprising:

- a frame having a front beam and a rear beam which globally extend along a transverse direction, and side beams which globally extend along a longitudinal direction, said front, rear and side beams being secured to one another, the frame defining an inner surface and further comprising attachments for attaching the frame to the cab,
- a supporting structure coupled to the frame and extending over the inner surface,
- wherein, in a normal state, the side beams maintain a nominal distance between the front and the rear beams,
- each side beam comprising at least a front segment connected to the front beam and a rear segment connected to the rear beam, wherein the segments globally extend along the longitudinal direction, are linked to each another and have a length smaller than the nominal distance, the front and rear segments being in a first relative position in the normal state,
- the bunk being configured to change from its normal state to a collapsed state in which the front and rear beams are spaced apart by a distance that is smaller than the nominal distance, and in which the front and rear segments remain linked to each another while being in a second relative position different from the first relative position.

Thus, following a vehicular collision, the bunk changes from its normal state to its collapsed state, the bunk being deformed by compression. In addition to dissipating energy, this limits or even avoids the risk of the bunk being moved or thrown forward up to the seats or even up to the occupants, as compared to bunks having rigid structures.

In the normal state, the side beams can be substantially straight. In the collapsed state, preferably, the side beams are not broken, but only deformed, meaning that their overall shape has changed Also, preferably, the side beams are still secured to the front and the rear beams. However, in case of a powerful collision, the front and rear segments could ultimately be disconnected from each other and/or from the corresponding front and rear beam, and some components of the bunk could be broken.

The terms "transverse" and "longitudinal" are used with respect to the vehicle, in the mounted position of the bunk in the vehicle. By "globally" is meant that the concerned beam is not necessarily straight over its whole length, but may include segments that extend in another direction.

The frame can be constituted by said front, rear and side beams. It may substantially form a rectangle. The supporting structure not necessarily covers the whole inner surface defined by the frame and/or is not necessarily continuous over said surface. It may take different forms provided it can support a mattress.

In an example, the front and rear segments are slidably linked to each other along a sliding direction that is substantially longitudinal. In other words, the front and rear segments may slide along their axes. Such an example forms a telescopic structure. For example, one segment can slide inside the other. The front segment preferably has its front end fixedly secured to the front beam, without possible relative movement, and the rear segment preferably has its rear end fixedly secured to the rear beam, without possible relative movement.

In another example, the front segment, respectively the rear segment, is pivotally connected to the front beam, respectively the rear beam, about a pivoting axis that is substantially vertical, the front and rear segments further being pivotally connected to each other about at least one pivoting axis that is substantially vertical, whereby in the collapsed state the front and rear segments are angled relative to each other. In other words, in the collapsed state, the segments no longer extend longitudinally; they are no longer perpendicular to the front and rear beams. Preferably, the segments are angled towards the inner surface, i.e. towards the vehicle median longitudinal plane, as an outward movement may not be possible because of the cab walls).

The bunk may further comprise fasteners for maintaining the front and rear segments of the side beams in the normal state, said fasteners being breakable above a predetermined threshold, to allow the bunk to change to its collapsed state. The fasteners may join the front and rear segments.

Preferably, the supporting structure is configured to be deformed, in order not to hinder the longitudinal compression of the bunk. The supporting structure can be deformed as a whole, meaning that the components of said supporting structure may keep their shape but move with respect to the frame. The supporting structure preferably is not broken in the collapsed state, but could break in case of a powerful collision.

In an example, the supporting structure comprises slats that extend between the front and the rear beams, for example substantially longitudinally. The front end, respectively the rear end, of each slat may be coupled to the front beam, respectively the rear beam, by a coupler which is breakable above a predetermined threshold.

After the couplers are broken, the slats are free to move with respect to the front and rear beams, for example by pivoting with respect to the front and rear beams about a vertical axis, while preferably remaining in the plane of the inner surface defined by the frame. Such a tilting movement makes it possible not to hinder the change of the bunk to its collapsed state; moreover, this avoids breaking the bunk main components (frame, slats). Even if such components cannot be reused, it prevents broken parts to be projected inside the cab and to injure the occupants.

Each slat may include a bar and a cap mounted on each bar end, the couplers being arranged on the caps.

The slat end faces may be angled relative to the slat axis, said end faces preferably being substantially parallel. Such an implementation allows guiding the movement of the slats when the bunk changes from its normal position to its collapsed position, and making said movement smoother. Therefore, the compression of the bunk is easier. In case the slat has end caps, the angled end faces of the slats may be provided on said caps.

The slats may be angled relative to the rear beam by an angle that is comprised between 74° and 89°. In other words, in this example, the slats are not perpendicular to the front and rear beams, i.e. do not extend exactly longitudinally: they are tilted with respect to the longitudinal direction by an angle comprised between 2° and 10°. Such an arrangement makes the beginning of the pivoting movement of the slats easier, and furthermore ensures that the movement is directed appropriately. In case the slat end faces are angled, the corresponding angle orientation is adapted to the orientation of the slats.

In another example, the supporting structure comprises a net of wires, such as metal wires, which is configured to be deformed when the bunk changes to its collapsed state. When deformed, the net can be compressed and/or bent. Such a supporting structure may further includes slats.

At least one beam, preferably one of the front and rear beams, may comprise a flange extending above an edge of the supporting structure and configured to prevent said supporting structure from moving apart from said beam. Thus, when the bunk changes to its collapsed state, it helps preventing the supporting structure from flying off the frame and being projected inside the cab. This may apply in particular, but not exclusively, to slats. For example, the flange may extend above one slat end portion. The flange preferably extends over all length of said beam. For example, said beam has a C-shaped cross-section.

The bunk may comprise a base having:

a support on which the frame can rest in a use position of the bunk, the support comprising mounts for being secured to a cab wall, optionally, at least one pole extending substantially vertically and downward from the support and provided at its lower end with a mount for being secured to a cab floor.

In the use position, the bunk is substantially horizontal. Preferably, the bunk can be moved to a storage position, for example by means of hinges coupling the frame (typically the rear beam) to a cab wall. Preferably, in the use position, only the front beam of the frame rests on the support.

The bunk may further comprise at least one stop arranged on the frame and configured to cooperate with a component secured to the cab, for preventing the front beam from moving forward in case of a vehicular collision. Thus, the rear beam moves closer to the front beam to get to the collapsed state, but the front beam does not move closer to the seats.

The or one of the stops can be secured to the front beam and be arranged to engage the support of the base from the rear.

Alternatively or in addition, the or one of the stops can protrude from at least one side beam of from the front beam, substantially transversely and away from the frame, the stop comprising an attaching portion for being attached to a component secured to a cab side wall. In other words, said stop protrudes outwardly, towards the cab side wall. Said stop may cooperate with a locker secured to the cab side wall, for example by means of a bracket attached to the cab B pillar. The cooperation between said stop and said locker may also be used to maintain the bunk in the use position.

According to a second aspect, the disclosure concerns a vehicle comprising a cab defining a driver compartment, the cab including at least one seat, the vehicle further comprising a bunk as previously described, said bunk being arranged rearward of the seat. Preferably, the side beams form the short edges of the bunk, while the front and rear beams form the long edges of the bunk.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

FIG. 18 is a partial side view of the front part of the bunk and its base.

FIG. 19 is a top view of the bunk in the normal state.

FIG. 20 is a top view of the bunk in a collapsed state.

DETAILED DESCRIPTION

Aspects set forth below represent the necessary information to enable those skilled in the art to practice the disclosure.

The disclosure aims at improving safety for the driver and possible occupants of a vehicle cab in case of a collision. In particular, an aim of the disclosure is to limit or avoid injuries caused by a bunk mounted rearward of the seat(s). To that end, the disclosure provides a bunk the structure of which is collapsible, to prevent the bunk from being pushed forward and reach the cab occupant(s).

Figure 1:
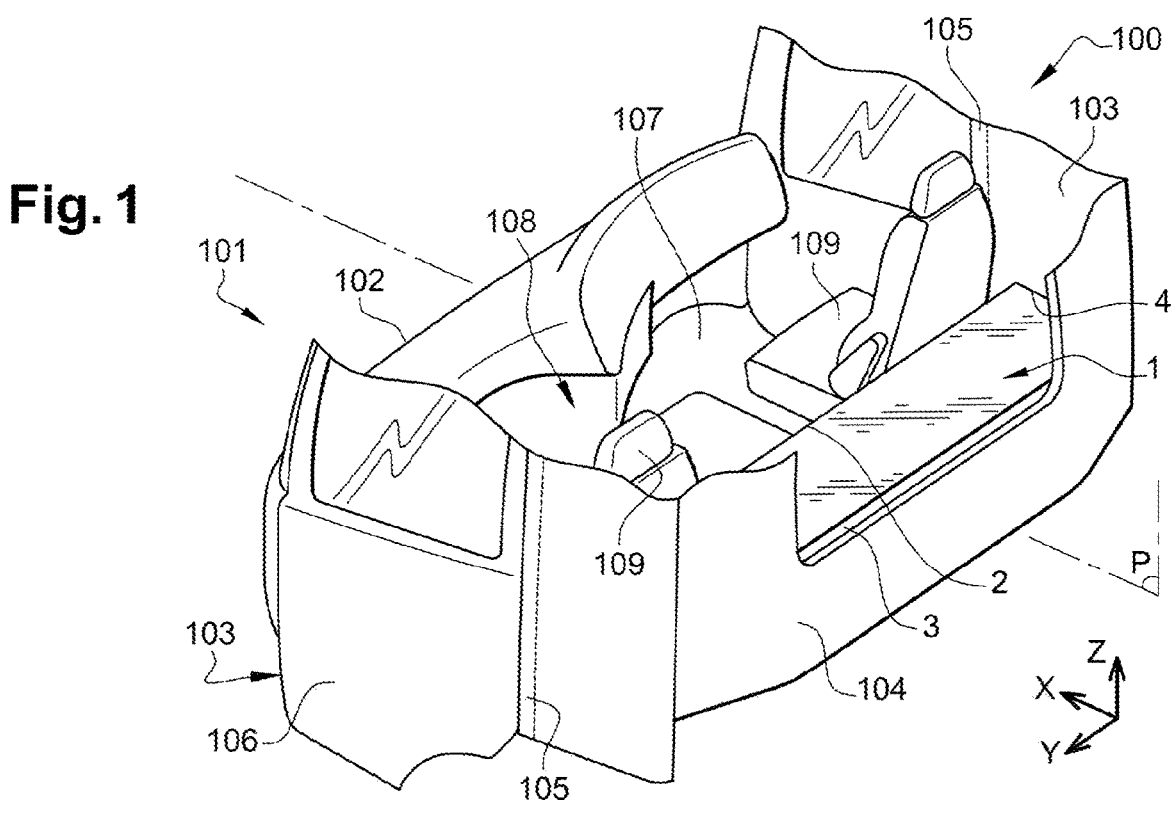
FIG. 1 is a perspective view of an interior of a vehicle cab, showing a bunk in the use position and in the normal state.
Figure 2:
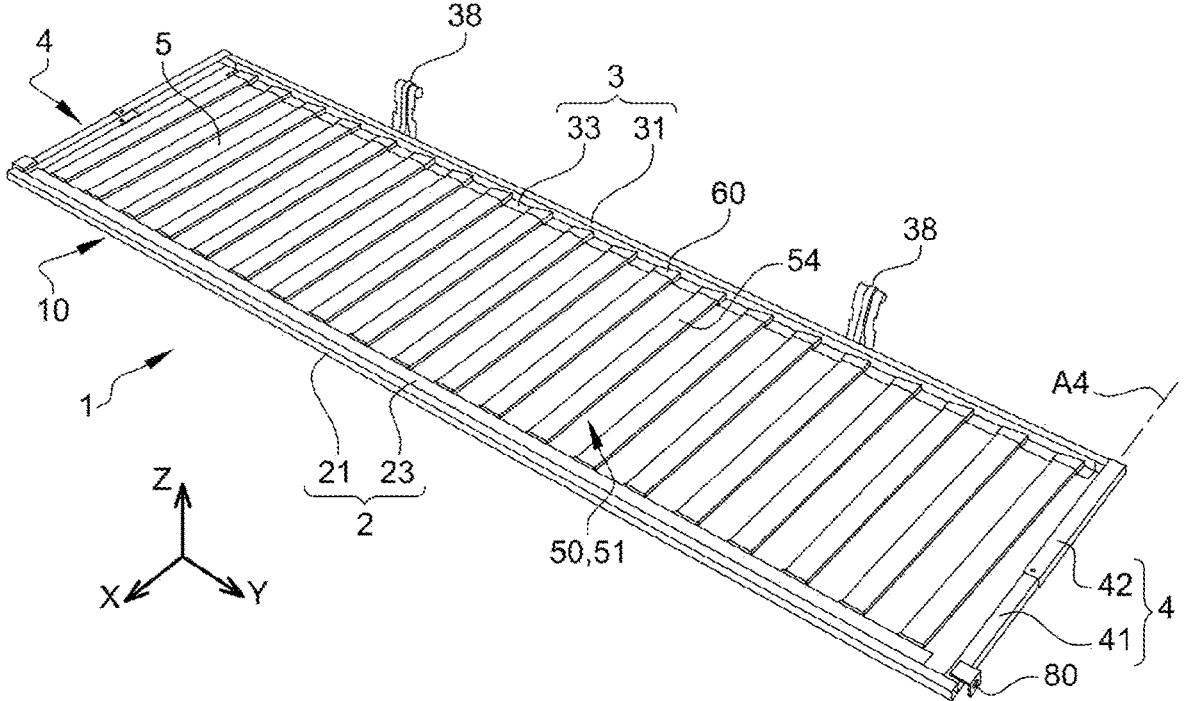
FIG. 2 is a perspective view of the bunk, according to an example.

FIG. 1 shows a vehicle 100, such as a truck, and more particularly a cab 101 of the vehicle 100. The cab 101 has a front wall 102, two side walls 103 and a rear wall 104. The side walls 103 each include a pillar 105, conventionally referred to as "B pillar". The side walls 103 further have a door 106 located between the B pillar 105 and the front wall 102. The cab 101 further has a floor 107, and forms a driver compartment 108. The cab 101 also comprises two seats 109, one for the driver and one for a possible passenger.

The cab 101 further comprises a bunk 1 which is arranged rearward of the seats 109. Indeed, behind the seats 109, i.e. between these seats 109 and the rear wall 104, there is provided a space which the driver generally uses to store various objects, but also to sleep during the night.

Z is defined as the vertical direction, X is defined as the longitudinal direction of the vehicle 1, and Y is defined as the transverse direction of the vehicle 1. The vehicle 100 has e median vertical longitudinal plane P, as shown in FIG. 1.

The bunk 1 comprises a frame 10 formed by a front beam 2 and a rear beam 3 which globally extend along the transverse direction Y, and side beams 4 which globally extend along the longitudinal direction X. Said beams can be made of metal, such as steel. Said beams are secured to one another, by welding, by fasteners, or any other appropriate means. In the illustrated example, the beams are substantially straight, so that the frame is rectangular; the front and rear beams 2, 3 form the long edges of the rectangle, while the side beams 4 form the short edges of the rectangle. The frame 10 thus defines an inner surface 5. The term "inner" is used for elements located in or directed towards the inner surface 5, as opposed to the term "outer". The frame 10 is attached to the cab 101 and, for that purpose, the frame 10 comprises attachments that will be described hereinafter in more detail.

The bunk 1 also comprises a supporting structure 50 which is coupled to the frame 10 and extends over the inner surface 5. The supporting structure 50 aims at supporting a mattress and a bunk occupant.

Figure 15:
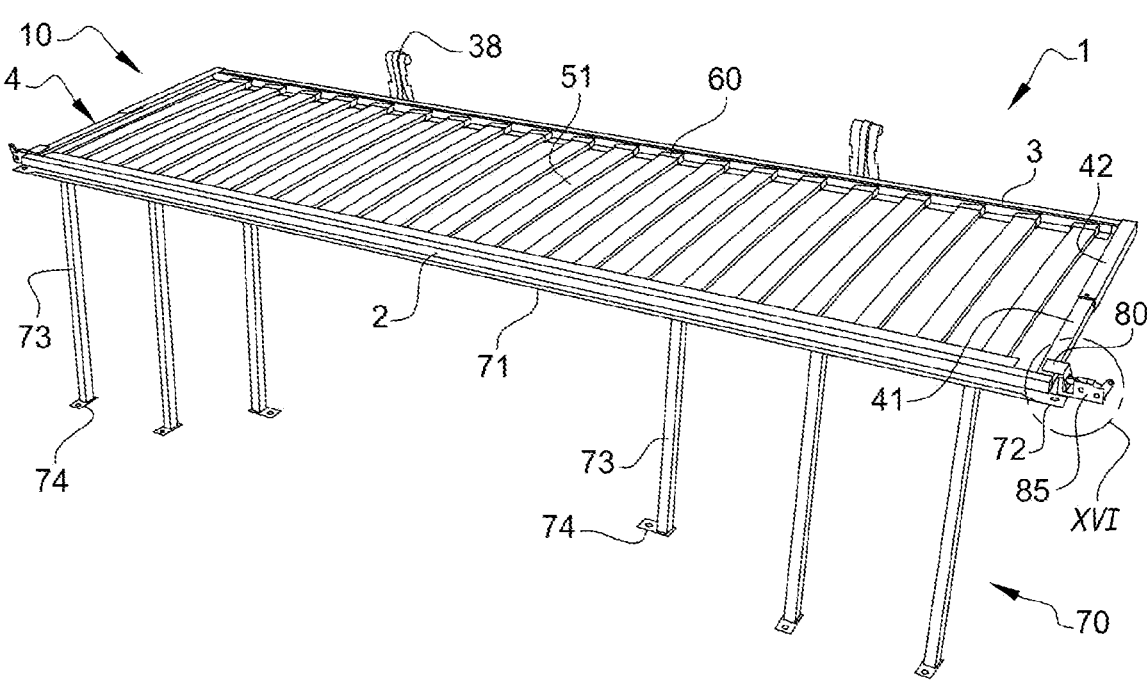
FIG. 15 is a perspective view of the bunk including a base thereof.

The bunk 1 can be in a use position, as illustrated in FIGS. 1 and 15, in which the frame 10 is substantially horizontal, or in a storage position (not shown) which allows easier or even unencumbered access to the area behind the seats 109. Said area may include storage compartments. For example, in the storage position, the bunk 1 may be located against the cab rear wall 104.

Now, the bunk 1 is described when it is in its use position, and in the normal state, i.e. its state at the first use, while it has not been deformed nor damaged. In such a normal state, the front beam 2 and the rear beam 3 are spaced apart by a nominal distance Dn, along the longitudinal direction X, as shown in FIG. 19.

A first example of the bunk 1 is described with reference to FIGS. 2 to 20.

Figure 3:
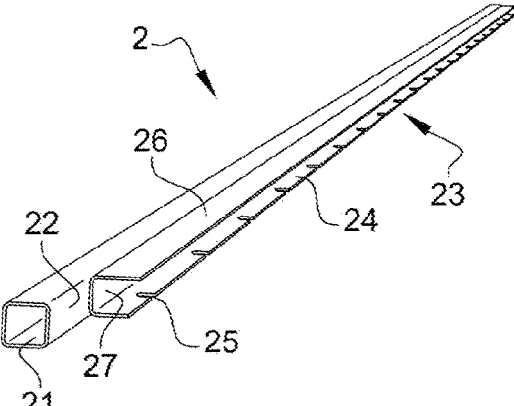
FIG. 3 is a perspective view of a front beam of the bunk.
Figure 4:
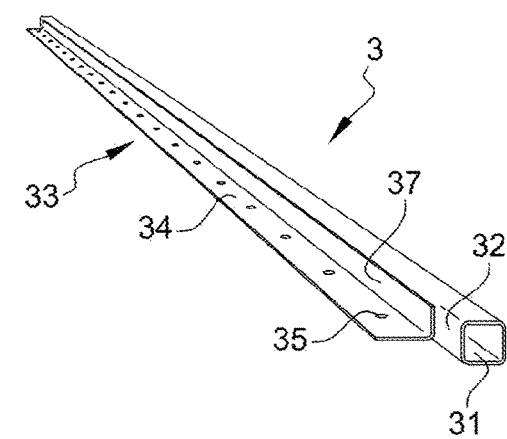
FIG. 4 is a perspective view of a rear beam of the bunk.

As shown in FIGS. 3 and 4, the front beam 2 and the rear beam 3 may comprise a profile 21, respectively 31, having a square cross-section. A holder 23, 33 for the supporting structure 50 may be secured on the inner face 22, 32 of each of the front beam 2 and the rear beam 3, i.e. the face turned towards the inner surface 5, thus towards the other beam. The holder 23, 33 may comprise a lower wall 24, 34 extending substantially in a horizontal plane, and on which the supporting structure 50 can rest. The lower wall 24, 34 may be provided with attachments for the supporting structure 50. In the illustrated example, said attachments are holes which are preferably arranged at regular intervals over the whole length of the front and rear beams 2, 3. More precisely, the lower wall 34 of the rear beam 3 may comprise circular holes 35 having a closed contour while the lower wall 24 of the front beam 2 may comprise elongated holes 25 which open at the inner edge of the lower wall 24. The holder 23 of the front beam 2 can have the shape of a C which is open towards the rear beam 3, said holder thus having an upper flange 26 which is substantially horizontal. The base portion 27 of the holder 23, which joins the lower wall 24 and the upper flange 26 may be welded to the profile 21. The holder 33 of the rear beam 3 can be L-shaped, the lower wall 34 forming one wing of the holder 33 and the other wing 37 being welded to the profile 31.

Each side beam 4 comprises a front segment 41 having a front end 43 secured to the front beam 2 and a rear segment 42 having a rear end 44 secured to the rear beam 3. The front segment 41 and the rear segment 42 extend coaxially along the longitudinal direction X. They are linked to each other, preferably at the rear portion of the front segment 41 and at the front portion of the rear segment 42. In the example of FIGS. 2 to 20, the front segment 41 is engaged in the rear segment 42 and can slide into it along their common axis A4 which forms a substantially longitudinal sliding direction. Of course, the reverse configuration, with the rear segment being engaged inside the front segment, is possible. Preferably, the segments 41, 42 have open profiles, such as C profiles, which improves the sliding effect and limits the risk that the segments get stuck. An open profile further allows movements not limited to the profile axis. In the normal state, the side beams 4 maintain the nominal distance Dn between the front beam 2 and the rear beam 3. Thus, each segment 41, 42 have a length that is smaller than the nominal distance Dn and, furthermore, the sum of the lengths of the segments 41, 42 is higher than the nominal distance Dn. For example, the front segment 41 and the rear segment 42 substantially have the same length that is higher than half the nominal distance Dn.

At least one fastener 45 may be provided for maintaining the front and rear segments 41, 42 of the side beams 4 in the normal state. A shown in FIG. 6, the fastener 45 can include a rivet, a screw or a pin engaged in corresponding holes 46 of the segments 41, 42.

Figure 11:
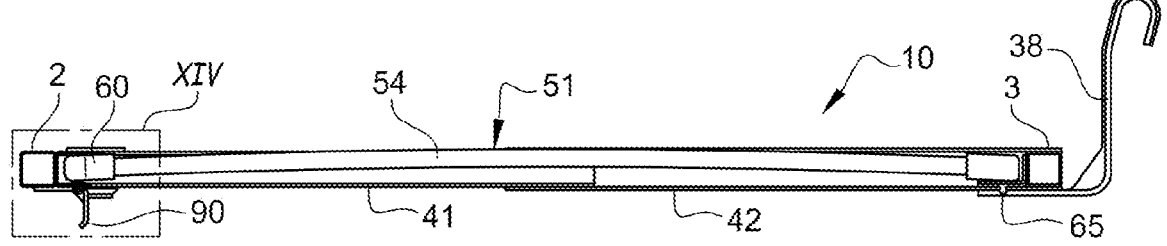
FIG. 11 is a side view of the bunk.

The supporting structure 50 of the first example comprises a plurality of slats 51 that have an axis A51 and that extend between the front beam 2 and the rear beam 3. The front end 52 of each slat 51 is coupled to the front beam 2 and the rear end 53 of each slat 51 is coupled to the rear beam 3. The slats 51 extend globally longitudinally between the beams 2, 3. Preferably, the slats 51 do not extend exactly longitudinally. More precisely, the slats 51 can be angled relative the rear beam 3 by an angle α that is different from 90°, and that is for example comprised between 74° and 89° (see FIG. 19). In other words, angle α is defined between the slat angle A51 and the axis of the rear beam 3, which in this example is the transverse direction Y. Moreover, the slats 51 can be not exactly horizontal but slightly bent upwards, as shown in FIG. 11.

In the illustrated example, each slat 51 comprises a bar 54 that may have a rectangular cross-section, and a cap 60 mounted on each bar end. The cap 60 can be made of plastic. The cap 60 forms a cavity into which one end of the slat 51 is housed. The cap 60 has a lower face 61 that rests on the lower wall 24, 34 of the holder 23, 33 of the corresponding beam 2, 3. From the lower face 61 extends a coupler 65 for coupling the slat 51 to the front beam 2, respectively the rear beam 3. The couplers 65 are configured to engage the holes 25, 35 provided on the holders 23, 33 of the beams 2, 3. Each coupler 65 can protrude vertically downward from the cap lower face 61 and can have an annular groove 66 allowing the coupler 65 to be fixed in the corresponding hole 25, 35 by clipping, as the lower wall 24, 34 is sandwiched between the cap lower face 61 and the lower wall 24, 34 while being partly received in the annular groove 66. As can be seen especially in FIGS. 2, 14 and 19, the cap 60 at the front end 52 of each slat 51 is engaged in the holder 23 of the front beam 2, between the lower wall 24 and the upper flange 26. In other words, the flange 26 extends above the front end 52 of the slat 51.

Figure 8:
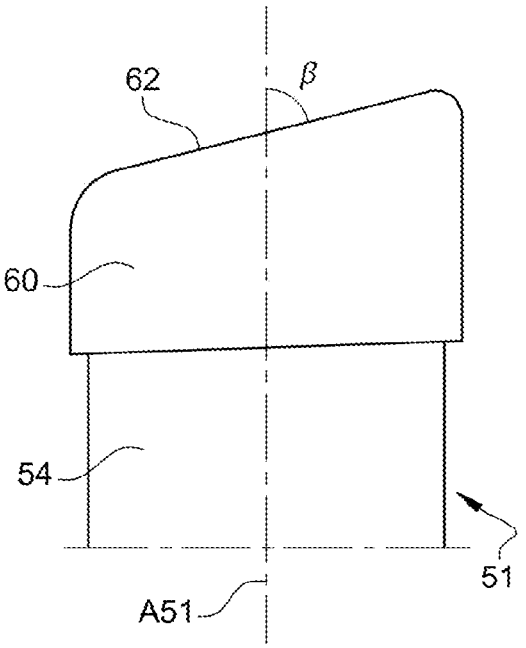
FIG. 8 is a detailed view of an end portion of the slat, showing a cap.
Figure 9:
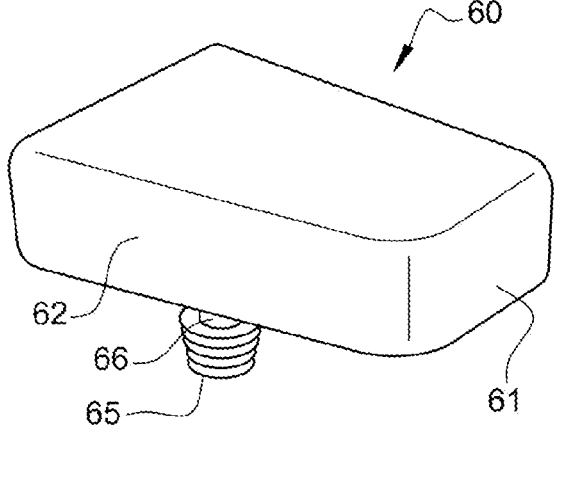
FIG. 9 is a perspective view of the cap.
Figure 10:
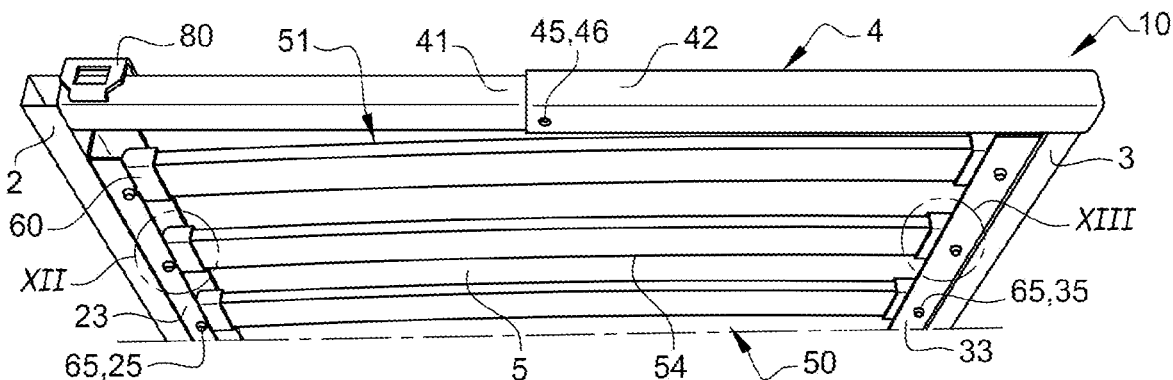
FIG. 10 is a perspective partial view of the bunk from one side and from below.

Moreover, the cap 60 has an end face 62 which is preferably angled relative to the slat axis A51 by an angle β, in the mounted position of the cap 60 on the bar 54. Angle β may be comprised between 60° and 75°, as shown in FIG. 8. Moreover, the end faces 62 of one slat 51 are preferably substantially parallel.

Now is described how the bunk 1 is secured to the cab 101.

The bunk 1 may comprise hooks 38 secured to the rear beam 3, for example welded to it, and coupled to an organ such as a rod secured to the cab rear wall 104. Said hooks 38 thus form attachments of the frame 10 to the cab 101, especially of the rear part of the frame 10. Said hooks 38 further form a hinge that allows moving the bunk 1 from its use position to its storage position, by a pivoting movement about a transverse axis located above the plane in which the bunk 1 lies in its use position.

The bunk 1 may further comprise a base 70, as shown in FIG. 15. The base 70 can be made of reinforcement bars.

The base 70 has a support 71 on which the frame 10 can rest in a use position of the bunk 1. The support 71 has mounts 72 for being secured to the cab 101. More specifically, the support 71 may include or be constituted by a transverse bar on which the front beam 2 of the frame 10 can rest, as shown in FIG. 18. Although in FIG. 18 the frame 10 is depicted as being directly in contact with the support 71, it could be envisaged that the frame 10 rests on an intermediate panel which itself rests on the support 71. The ends of the transverse bar 71 are secured by any appropriate means, such as fasteners, to the cab side walls 103, preferably to the B pillar 105. The base 70 also has poles 73 extending substantially vertically and downward from the support 71. Each pole 73 is provided at its lower end with a mount 74 secured to the cab floor 107.

The bunk 1 is maintained in the use position by at least one stop arranged on the frame 10 and configured to cooperate with a component secured to the cab 101. In particular, one stop may be provided on at least a side front part of the frame 10.

Figure 16:
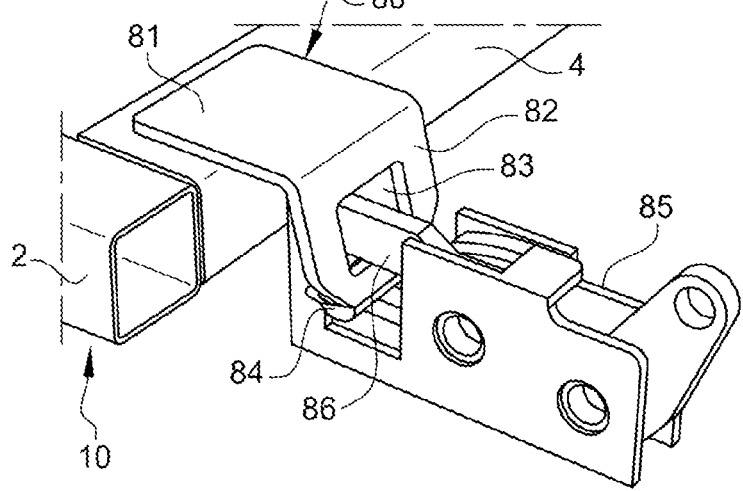
FIG. 16 is an enlarged view of the detail XVI of FIG. 15.
Figure 17:
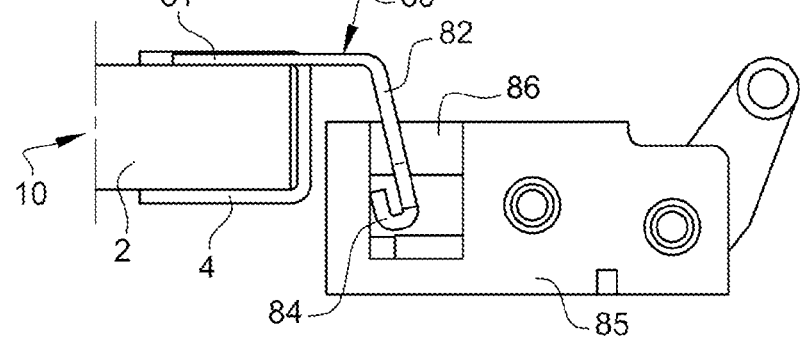
FIG. 17 is a front view corresponding to FIG. 16.

In the example shown in FIGS. 2 and 15 to 17, one stop 80 protrudes from each side beam 4, close to the front beam 2, substantially transversely and away from the frame 10. The stop 80 may be in the form of a L-bracket having a first wing 81 which is secured to the side beam 4, for example by welding, and extends towards the adjacent side wall 103 of the cab 101, and a second wing 82 which extends downward, for example in a plane (X,Z). The second wing 82 may comprise an opening 83 and a hooked end 84. As best shown in FIGS. 16 and 17, the stop 80 cooperates with a locker 85 secured to the cab side wall 103, preferably to the B pillar 105, by means of an appropriate member such as a bracket (not shown). More specifically, a tab 86 of the locker 85 is inserted in the opening 83 of the stop second wing 82.

The stop 80 and locker 85 prevent the frame 10 from moving to the storage position, in particular in case of a roll-over of the vehicle 100.

The bunk 1 is configured to change from its normal state to a collapsed state, especially in case of a vehicular collision, as will now be described.

Following a crash impact, the frame 10 is pushed forward.

Figure 5:
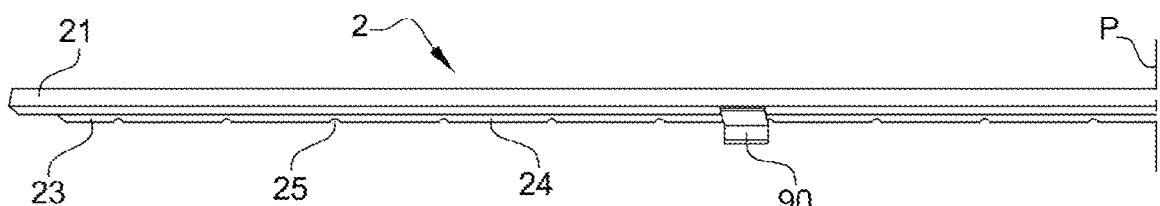
FIG. 5 is a partial perspective view of the front beam, seen from the front and slightly from under.
Figure 6:
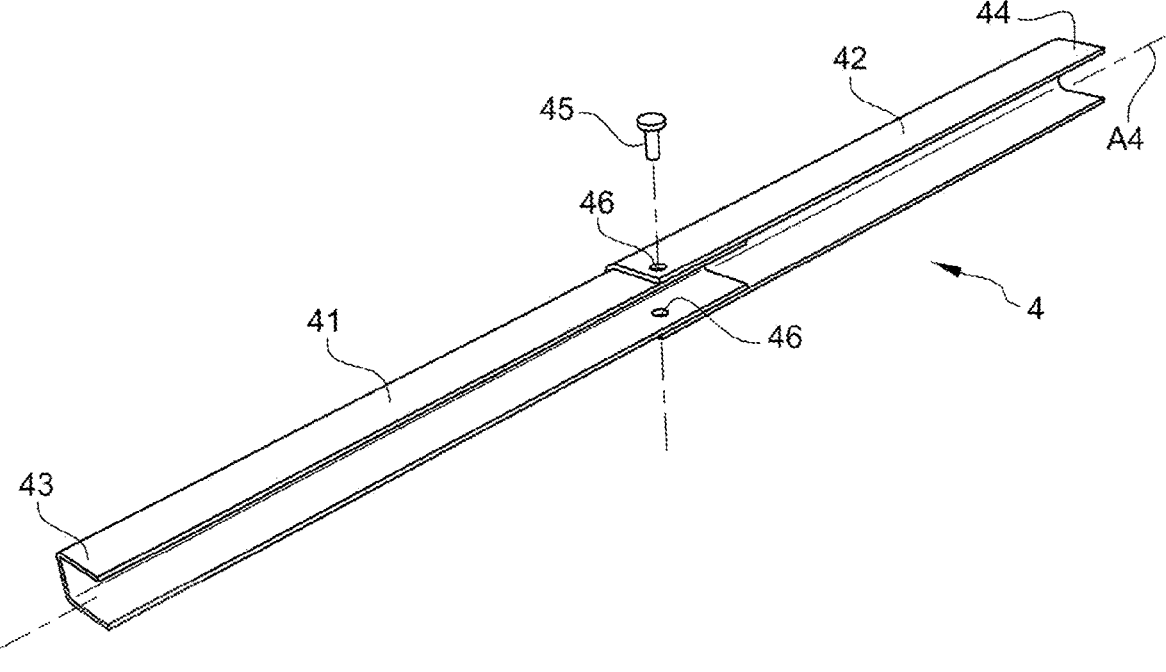
FIG. 6 is a perspective view of a side beam of the bunk, in the normal state.
Figure 7:
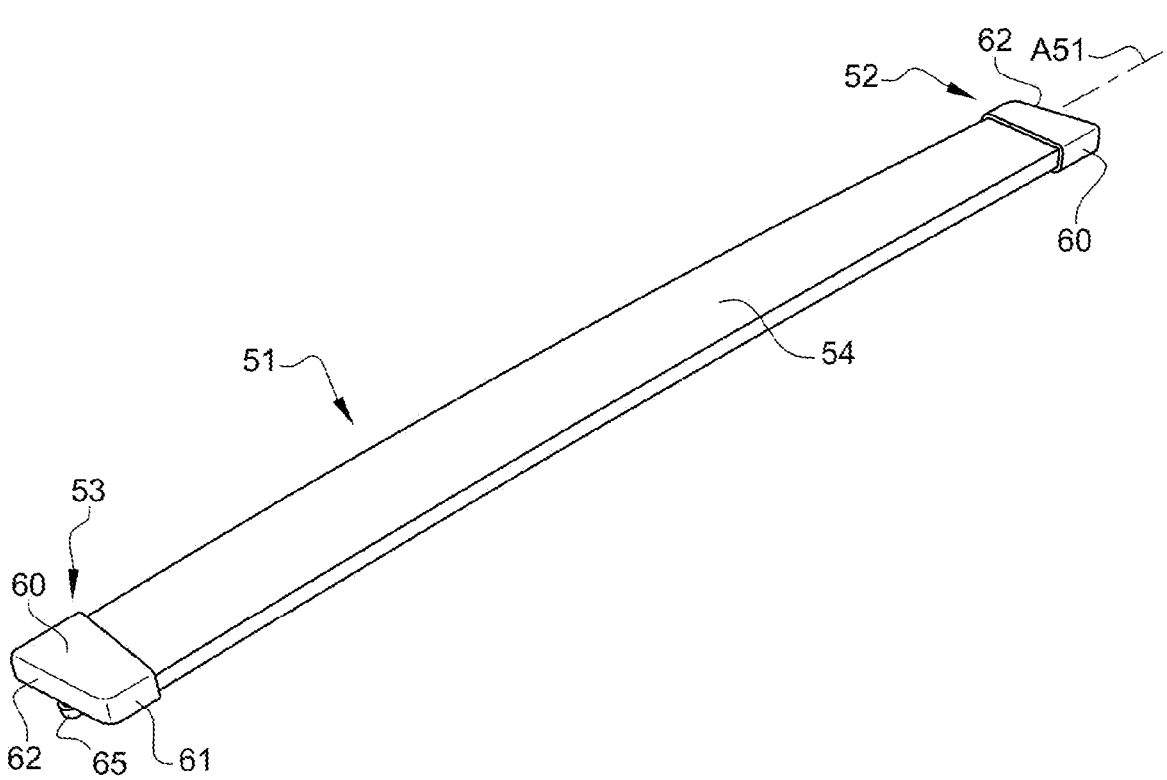
FIG. 7 is a perspective view of an example of a slat pertaining to a supporting structure of the bunk.
Figure 14:
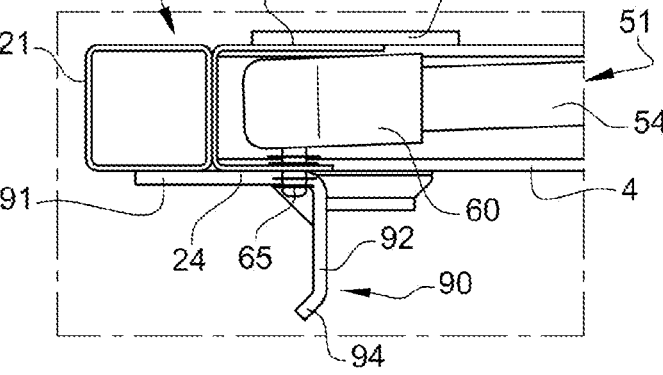
FIG. 14 is an enlarged view of the detail XIV of FIG. 11.

But the front part of the frame 10 is prevented from moving forward, so that it does not hit the seats 109 and their occupant(s). This is achieved at least partly by the cooperation between the stop 80 and the locker 85. Another stop 90 may be secured to the front beam 2 as shown in FIGS. 5 and 14. The stop 90 may be in the form of a L-bracket having a first wing 91 which is secured to and under the front beam 2, for example by welding, and extends substantially horizontally, and a second wing 92 which extends downward, preferably in a plane (Y,Z). The second wing 92 may comprise an end 94 bent forward. As best shown in FIG. 18, the stop 90 is configured to engage the support 71 of the base from the rear, thereby preventing a further forward movement of the frame 10 with respect to the cab 101.

As the front beam 2 is prevented from moving forward, the rear beam 3, which is pushed forward, tends to move closer to the front beam 2. The resulting mechanical strains in the frame 10 lead to the following components being broken: the fasteners 45 between the front and rear segments 41, 42 of the side beams 4, and the couplers 65 between the slat 51 and the front and rear beams 2, 3. Indeed, the fasteners 45 and the couplers 65 are designed to be breakable above a predetermined threshold. In other words, they are frangible components, i.e. they are made intentionally breakable, as part of their operation, to allow the bunk 1 to change to its collapsed state.

The fasteners 45 being broken, the segments 41, 42 of the side beams 4 are free to slide with respect to one another, while remaining engaged the one into the other, so that the distance between the front beam 2 and the rear beam 3 is shortened.

As a consequence, the slats 51 undergo a tilting movement in the plane of the frame 10 and with respect to their initial globally longitudinal orientation. Owing to the initial slight inclination of the slats 51 with respect to the longitudinal direction X (angle α), the slats 51 automatically tend to move in a direction in which said inclination is accentuated. Furthermore, the angle β of the slat end faces 62 allows guiding the tilting movement of the slats 51. Angles α and β thus ensure an easier movement of the slats 51 further to a collision and, consequently, an easier movement of the rear beam 3.

Angles α and β, and the corresponding orientations conferred to the slats 51 and end faces 62, are consistent with each other. This means that the orientation due to angle α and the orientation due to angle β both tend to move the slat 51 relative to the rear beam 3 according to the same pivoting direction. For example, with reference to FIG. 19, the movement of the slats 51 correspond to the front end 52 of the slat 51 moving towards the right of the figure.

Figure 12:
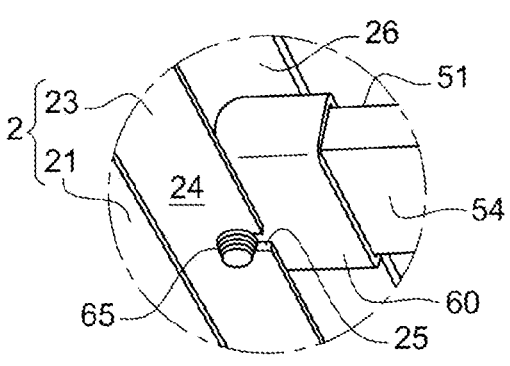
FIG. 12 is an enlarged view of the detail XII of FIG. 10.
Figure 13:
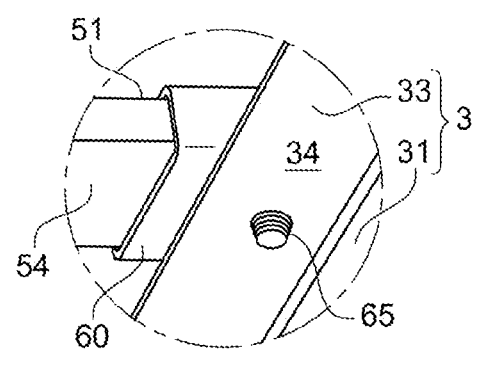
FIG. 13 is an enlarged view of the detail XIII of FIG. 10.

Besides, owing to the flange 26 of the holder 23 of the front beam 2, which extends above the front end portion of the slats 51, as best seen in FIG. 12, the slats 51 are prevented from moving out of the holder 23, flying off the frame 10 and being projected inside the cab 101.

FIG. 20 shows the bunk 1 in the collapsed state. The front and rear beams 2, 3 are spaced apart by a distance D that is smaller than the nominal distance Dn; the side beams 4 are retracted, with the front segment 41 engaged further into the rear segment 42; the slats 51 are angled relative to the rear beam 3 by an angle which may be greater than 40°. The bunk 1 has not been projected inside the driver compartment 108 and has not hit the seats 109. Depending on the impact, the bunk 1 may have come into contact with the seats 109, but with a very limited speed unlikely to cause injuries. The frame 10 has kept its overall shape but has been compressed along the longitudinal direction X.

A second example of the bunk 1 is described with reference to FIGS. 21 to 23. The bunk is substantially identical to the one of the first example except for the side beams 4 which are not telescopic.

Figure 21:
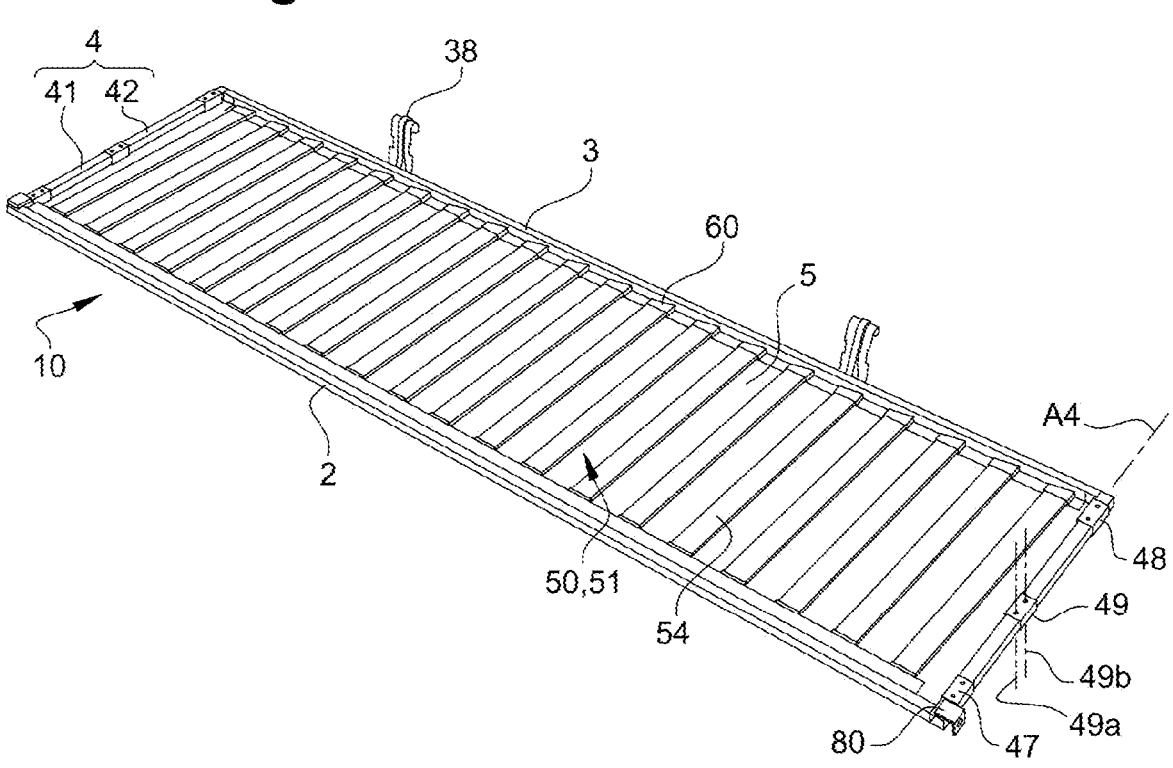
FIG. 21 is a perspective view of a bunk according to another example, in the normal state.
Figure 22:
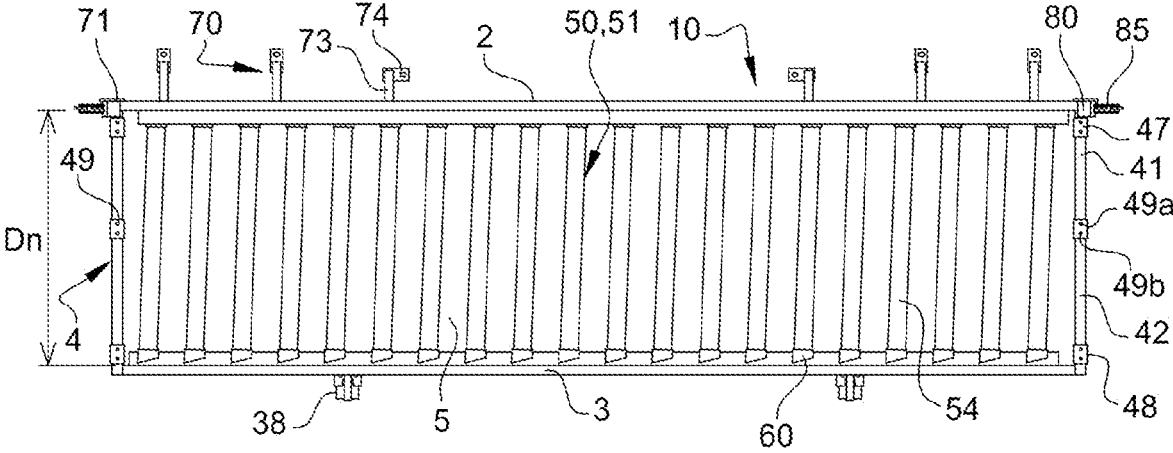
FIG. 22 is a top view of the bunk of FIG. 21, in the normal state.

As shown in FIGS. 21 and 22, in the normal state, the front segment 41 of each side beam 4 is pivotally connected to the front beam 2 by a hinge 47, the rear segment 42 of each side beam 4 is pivotally connected to the rear beam 3 by a hinge 48. Moreover, the front segment 41 and the rear segment 42 are pivotally connected to each other by a hinge 49. The hinges 47, 48, 49 define pivoting movements about pivoting axes that are substantially vertical. More specifically, the front segment 41 and the rear segment 42 may be connected to the hinge 49 respectively about a first pivoting axis 49a and a second pivoting axis 49b. The hinge 49 may be located in the middle of the side beam 4, meaning that the front and rear segments 41, 42 may have substantially the same length. Breakable fasteners (not shown) maintain the front segment 41 and the rear segment 42 in the normal state, in which they form a substantially straight and longitudinal side beam 4.

Figure 23:
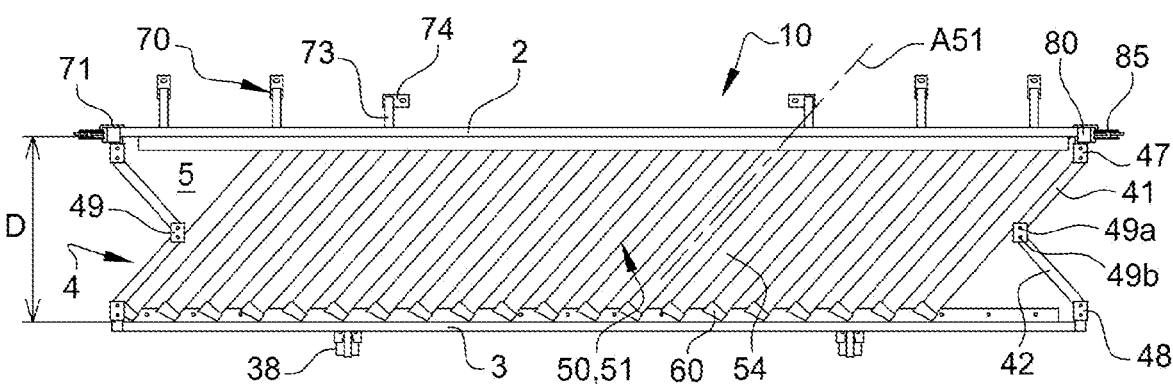
FIG. 23 is a top view of the bunk of FIG. 21, in a collapsed state.

Thus, when the bunk 1 changes from its normal state to its collapsed state, the segments 41, 42 remain linked to one another by the hinge 49 but move from a coaxial position to an angled position, as shown in FIG. 23, after the fasteners are broken. The movement of the rear beam 3 towards the front beam 2 results in the side beams 4 forming inwardly directed angles.

Figure 24:
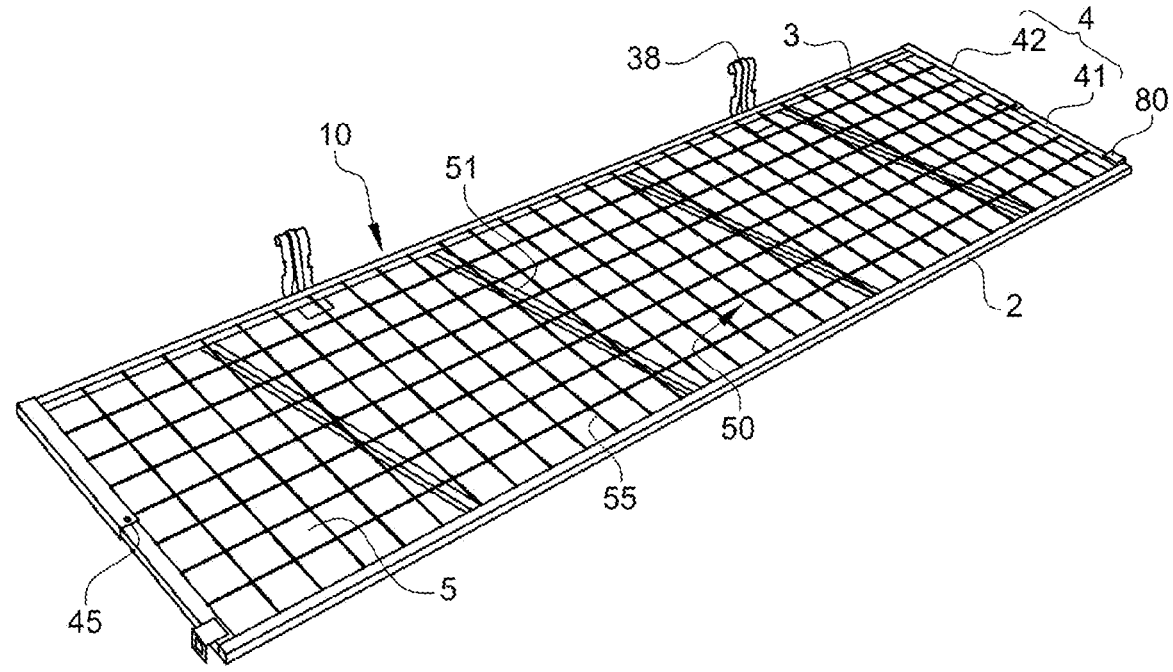
FIG. 24 is a perspective view of a bunk according to still another example, in the normal state.
Figure 25:
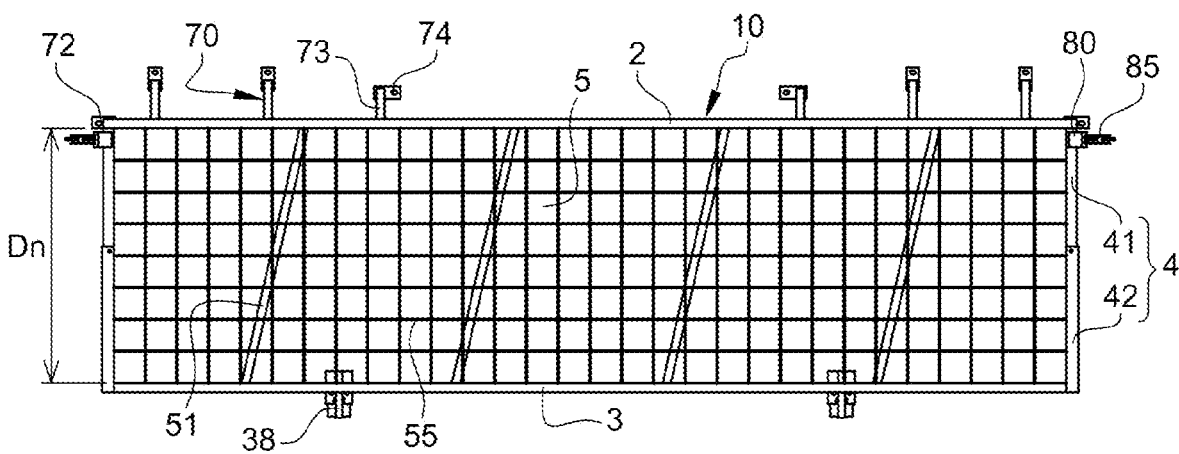
FIG. 25 is a top view of the bunk of FIG. 24, in the normal state.
Figure 26:
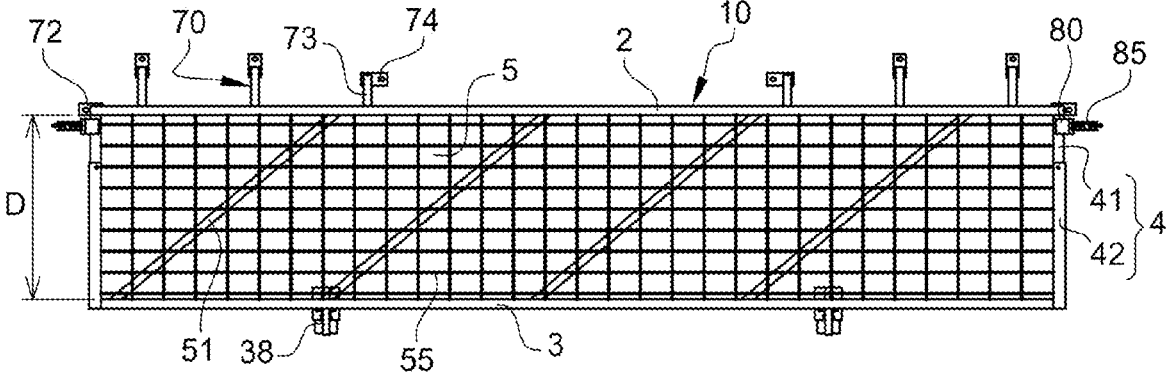
FIG. 26 is a top view of the bunk of FIG. 24, in a collapsed state.

A third example of the bunk 1 is described with reference to FIGS. 24 to 26. The bunk is substantially identical to the one of the first example except for the supporting structure 50.

In the third example, the supporting structure 50 comprises a net of wires 55, such as metal wires. In the normal state, the net substantially lies in a horizontal plane, or can be slightly bent upwards. When the bunk 1 changes to its collapsed state, the net is deformed: the wires 55 move closer to each other in the longitudinal direction; they can further be bent. One advantage of this example is that a net may be easier to deform/compress following a collision.

The supporting structure 50 may also include slats 51 under the net. These slats 51 can be tilted with respect to the rear beam 3 after the couplers with the front and rear beams 2, 3 are broken, as previously described.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A bunk for a cab of a vehicle, comprising:
a frame having a front beam and a rear beam which extend along a transverse direction, and side beams which extend along a longitudinal direction, the front, rear and side beams being secured to one another, the frame defining an inner surface and further comprising attachments for attaching the frame to the cab; and
a supporting structure coupled to the frame and extending over the inner surface;
wherein, in a normal state, the side beams maintain a nominal distance between the front and the rear beams;
each side beam comprising at least a front segment connected to the front beam and a rear segment connected to the rear beam, wherein the segments extend along the longitudinal direction, are linked to each another and have a length smaller than the nominal distance, the front and rear segments being in a first relative position in the normal state; and the bunk being configured to change from the normal state to a collapsed state in a vehicular collision in which the front and rear beams are spaced apart by a distance that is smaller than the nominal distance, and in which the front and rear segments remain linked to each another while being in a second relative position different from the first relative position.

2. The bunk of claim 1, wherein the front and rear segments are slidably linked to each other along a sliding direction that is substantially longitudinal.

3. The bunk of claim 1, wherein the front and rear segments are pivotally connected to each other about at least one pivoting axis that is substantially vertical, whereby in the collapsed state the front and rear segments are angled relative to each other.

4. The bunk of claim 1, further comprising fasteners for maintaining the front and rear segments of the side beams in the normal state.

5. The bunk of claim 1, wherein the supporting structure comprises slats that extend between the front and the rear beams, the front segment, respectively the rear segment, of each slat being coupled to the front beam, respectively the rear beam, by a coupler.

6. The bunk of claim 5, wherein each slat includes a bar and a cap mounted on each bar end, the couplers being arranged on the caps.

7. The bunk of claim 5, wherein each slat comprises a slat end face angled relative to a slat axis.

8. The bunk of claim 5, wherein the slats are angled relative to the rear beam by an angle that is comprised between 74° and 89°.

9. The bunk of claim 1, wherein the supporting structure comprises a net of wires, which is configured to be deformed when the bunk changes to the collapsed state.

10. The bunk of claim 1, wherein at least one beam comprises a flange extending above an edge of the supporting structure and configured to prevent the supporting structure from moving apart from the beam.

11. The bunk of claim 1, further comprising a base having:

a support on which the frame can rest in a use position of the bunk, the support comprising mounts for being secured to a cab wall; and at least one pole extending substantially vertically and downward from the support and provided at a lower end with a mount for being secured to a cab floor.

12. The bunk of claim 1, further comprising at least one stop arranged on the frame and configured to cooperate with a component secured to the cab, for preventing the front beam from moving forward in case of the vehicular collision.

13. The bunk of claim 11, wherein the at least one stop is secured to the front beam and is arranged to engage the support of the base from the rear.

14. The bunk of claim 11, wherein the at least one stop protrudes from at least one side beam of the front beam, substantially transversely and away from the frame, the at least one stop comprising an attaching portion for being attached to a component secured to a cab side wall.

15. A vehicle comprising a cab defining a driver compartment, the cab including at least one seat, the vehicle further comprising the bunk of claim 1, the bunk being arranged rearward of the at least one seat.

* * * * *